(12) United States Patent
Hori et al.

(10) Patent No.: US 8,107,773 B2
(45) Date of Patent: Jan. 31, 2012

(54) VIDEO SIGNAL PROCESSING APPARATUS AND VIDEO SIGNAL PROCESSING METHOD

(75) Inventors: Yasuhiro Hori, Tokyo (JP); Shin Arai, Tokyo (JP); Koichi Sato, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1161 days.

(21) Appl. No.: 11/861,543

(22) Filed: Sep. 26, 2007

(65) Prior Publication Data

US 2008/0080790 A1    Apr. 3, 2008

(30) Foreign Application Priority Data

Sep. 27, 2006  (JP) .................................. 2006-263197

(51) Int. Cl.
G06K 9/32    (2006.01)
(52) U.S. Cl. .......................................... 382/300
(58) Field of Classification Search .................. 382/300
See application file for complete search history.

(56) References Cited

U.S. PATENT DOCUMENTS

| | | | |
|---|---|---|---|
| 4,985,764 A | | 1/1991 | Sato |
| 5,019,903 A | * | 5/1991 | Dougall et al. ............... 348/448 |
| 5,032,899 A | | 7/1991 | Sato |
| 5,832,143 A | * | 11/1998 | Suga et al. ...................... 382/300 |
| 6,219,464 B1 | * | 4/2001 | Greggain et al. .............. 382/298 |
| 6,262,773 B1 | * | 7/2001 | Westerman .................... 348/448 |
| 7,123,781 B2 | | 10/2006 | Maenaka et al. |
| 7,292,738 B1 | * | 11/2007 | Ma et al. ........................ 382/300 |
| 7,697,790 B2 | * | 4/2010 | Kim et al. ...................... 382/300 |
| 2003/0112369 A1 | * | 6/2003 | Yoo et al. ....................... 348/448 |
| 2004/0114833 A1 | | 6/2004 | Jiang |
| 2004/0246546 A1 | * | 12/2004 | Minami et al. ................ 358/525 |
| 2004/0263684 A1 | | 12/2004 | Tanaka |
| 2006/0018564 A1 | | 1/2006 | Hori et al. |

FOREIGN PATENT DOCUMENTS

| | | |
|---|---|---|
| CN | 1574951 | 2/2005 |
| JP | 2003-230109 | 8/2003 |
| JP | 2005-293361 | 10/2005 |

OTHER PUBLICATIONS

Chinese Office Action for 2007101691774 mailed on Jan. 15, 2010.
Japanese Office Action for Japanese Patent Application Serial No. 2006-263197 mailed on Jul. 12, 2011.

* cited by examiner

Primary Examiner — Wesley Tucker
(74) Attorney, Agent, or Firm — Turocy & Watson, LLP

(57) ABSTRACT

A video-signal processor includes: a first correlation detector obtaining a correlation value of every symmetric pair of pixels positioned in point-symmetry around an interpolation pixel on an interpolation line interpolated between two real lines; a second correlation detector obtaining a correlation value of every pair of pixels for the symmetric pair of pixels and parallel pair(s) of pixels positioned in a direction parallel to a direction of the symmetric pair of pixels; a correlation-direction deciding unit deciding one of a correlation direction based on the correlation value from the first correlation detector and that based on the correlation value from the second correlation detector as a correlation direction which is a direction of the pair of pixels used for generating the interpolation pixel; and an interpolation pixel generator generating a pixel signal of the interpolation pixel using a pair of pixels based on decision result of the correlation-direction deciding unit.

9 Claims, 8 Drawing Sheets

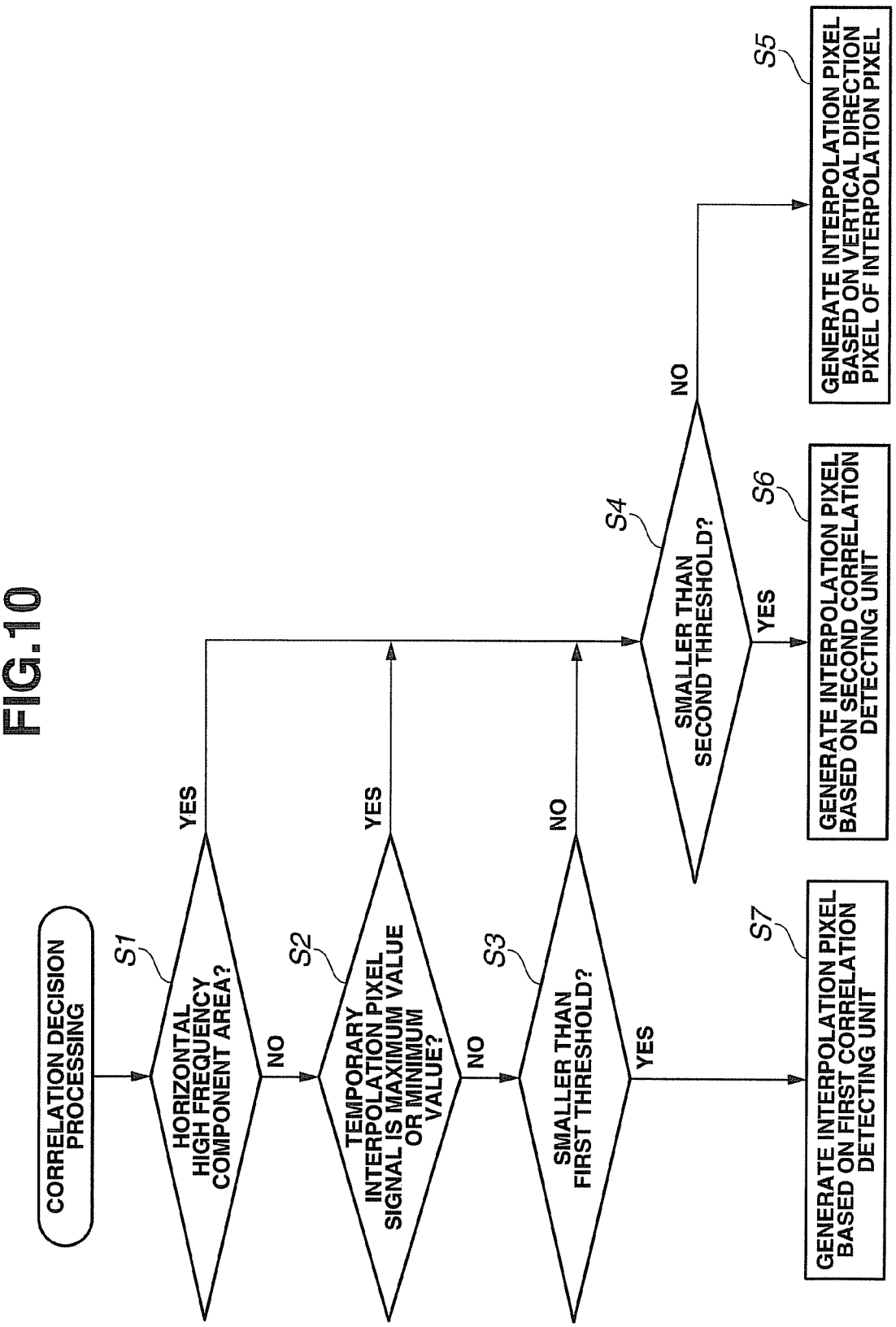

VIDEO SIGNAL PROCESSING APPARATUS AND VIDEO SIGNAL PROCESSING METHOD

CROSS REFERENCE TO RELATED APPLICATION

This application is based upon and claims the benefit of priority from the prior Japanese Patent Application No. 2006-263197 filed on Sep. 27, 2006; the entire contents of which are incorporated herein by reference.

BACKGROUND OF THE INVENTION

1. Field of the Invention

The present invention relates to a video signal processing apparatus and a video signal processing method which are suitable for a scanning line interpolation circuit, etc. configured to convert scanning lines from a video signal of an interlaced mode to a video signal of a progressive mode.

2. Description of the Related Art

A plasma display apparatus, a liquid crystal display apparatus, etc. configure a matrix display apparatus in which pixels are placed in a matrix state corresponding to intersecting points of a plurality of scanning lines and data lines. In the matrix display apparatus, video information per pixel is sequentially displayed for every scanning line so that an image is displayed.

Some of such matrix display apparatuses have a display screen whose resolution is higher than the resolution of an input video signal. In such a case, a scanning line interpolation circuit may be adopted which improves the image quality by setting a interpolation line between scanning lines based on inputted video signals, and generating interpolation pixels on the interpolation line.

Some scanning line interpolation circuit may generate the interpolation pixel according to an average value of pixels of upper and under lines of the interpolation line. However, this interpolation method may generate such an image that a diagonal line looks as jagging, what we say, jaggy is conspicuous in some patterns.

Thus, Japanese Patent Laid-open No. 2003-230109 proposes a line scanning line interpolation circuit which averages highly-correlative diagonal direction pixel values to prevent the resolution degradation of diagonal edges. In this proposal, in the respective pixels of upper and under lines of the interpolation line, a pair of pixels are used for the interpolation, which is positioned at a point-symmetric point whose center is an interpolation pixel of the interpolation line. The correlation is detected for each of such pair of pixels, and a direction of a pair of pixels whose correlation is highest is decided to be a direction of a pixel (correlation direction) whose correlation is high with respect to the interpolation pixel. Next, the interpolation pixel is generated by using two pixels positioned in the correlation direction.

However, in a pattern part which is relatively slender, diagonal, and line-like, etc., the correlation direction may not be correctly specified. For example, it is assumed that a pair of pixels for specifying the correlation direction is positioned at background parts of both sides crossing over the line-like pattern. In such a case, if the brightness of the background parts is approximately the same, it may be considered that the correlation direction obtained for the interpolation pixel in the line-like pattern is specified as not a direction of the line but a direction of the pair of pixels positioned at the background. If so, the interpolation pixel in the line-like pattern is interpolated by using two pixels of the background, then breaks, unsharpness, jaggy may be induced in the line-like pattern.

SUMMARY OF THE INVENTION

A video signal processing apparatus according to an aspect of the present invention includes: a first correlation detecting unit obtaining a correlation value of every symmetric pair of pixels positioned in a point-symmetry center of which is an interpolation pixel on an interpolation line interpolated between two real lines, the symmetric pair of pixels being positioned on the two real lines of an input video signal respectively; a second correlation detecting unit obtaining a correlation value of every pair of pixels for the symmetric pair of pixels and one or more parallel pairs of pixels positioned in a direction which is parallel to a direction of the symmetric pair of pixels, the parallel pair of pixels being positioned on the two real lines of the input video signal respectively; a correlation direction deciding unit deciding any one of a correlation direction based on the correlation value from the first correlation detecting unit and a correlation direction based on the correlation value from the second correlation detecting unit as a correlation direction which is a direction of a pair of pixels used for generating the interpolation pixel; and an interpolation pixel generating unit generating a pixel signal of the interpolation pixel by using the pair of pixels based on a decision result of the correlation direction deciding unit.

BRIEF DESCRIPTION OF THE DRAWINGS

FIG. 10 is a flowchart illustrating operations of the fourth embodiment.

DETAILED DESCRIPTION OF EMBODIMENTS OF THE INVENTION

Figure 1:
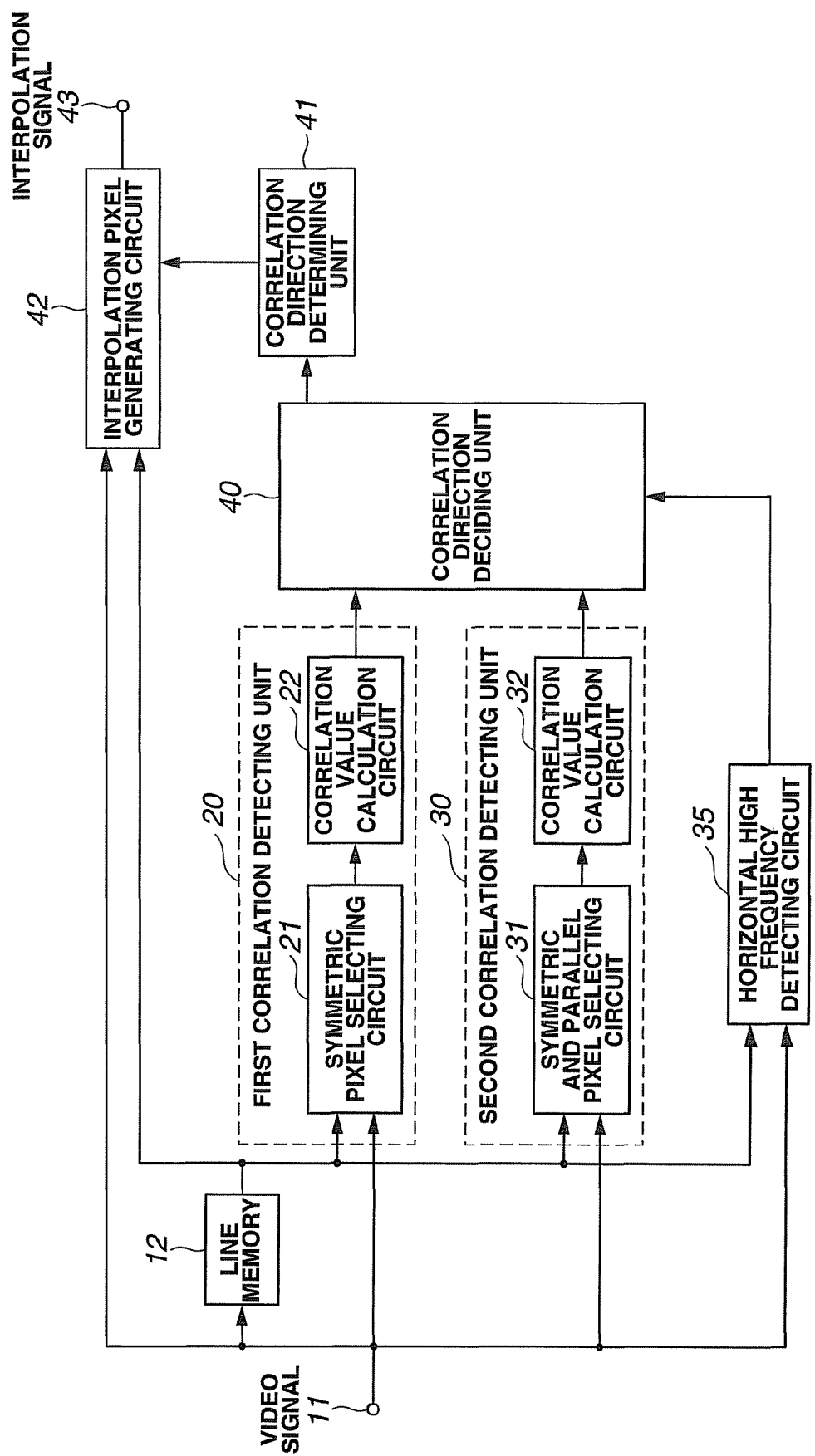
FIG. 1 is a block diagram illustrating a video signal processing apparatus according to a first embodiment of the present invention.

Embodiments of the present invention will be described in detail below referring to the drawings.

First Embodiment

FIG. 1 is a block diagram illustrating a video signal processing apparatus according to a first embodiment of the present invention. The present embodiment is an example applied to a scanning line interpolation circuit.

In FIG. 1, a video signal is inputted to an input terminal 11. The input video signal is provided to a line memory 12. The line memory 12 memorizes a line (horizontal period) of inputted video signal. Input and output of the line memory 12 are video signals before and after one line. The input video signal from the input terminal 11 and the video signal from the line memory 12 are delivered to first and second correlation detecting units 20 and 30, and a horizontal high frequency detecting circuit 35.

The first correlation detecting unit 20 detects a pair of pixels whose correlation with an interpolation pixel is high to select a pair of pixels used for generating a pixel to be interpolated (interpolation pixel) on an interpolation line. That is, the first correlation detecting unit 20 obtains a correlation of each pair of pixels which are positioned at a point-symmetric point whose center is an interpolation pixel in the respective pixels on upper and under lines (real line) of the interpolation line.

A symmetric pixel selecting circuit 21 includes a memory which is not illustrated, holds pixel signals whose position is point-symmetric with the interpolation pixel in inputted video signals (pixel signal) of the respective pixels of two lines, and outputs to a correlation value calculation circuit 22.

Figure 2:
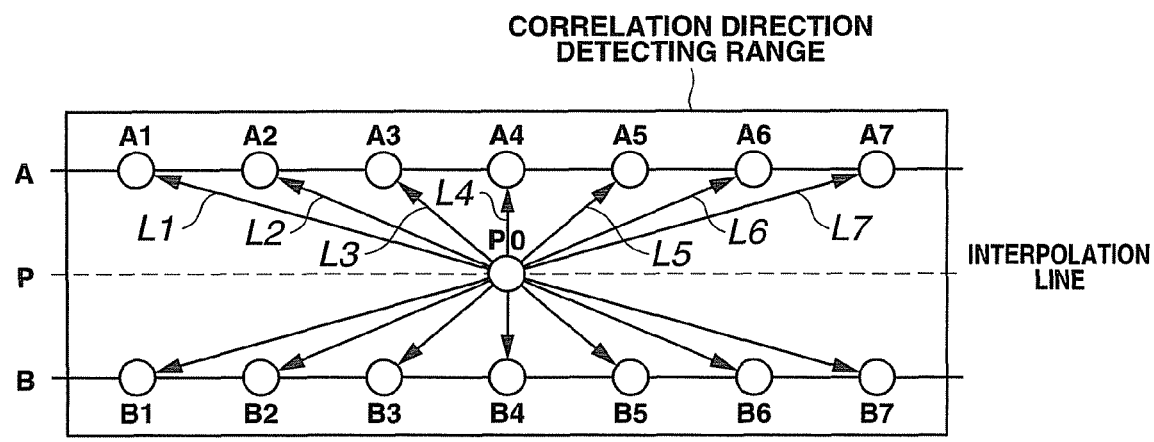
FIG. 2 is an explanatory diagram describing a first correlation detecting unit 20.

FIG. 2 is an explanatory diagram describing the first correlation detecting unit 20. In FIG. 2, horizontal lines A and B represent two lines which are adjacent to each other in an image. A mark; represents a pixel position. A horizontal line P represents an interpolation line, and a pixel P0 on the interpolation line P represents an interpolation pixel to be generated.

The first correlation detecting unit 20 sets a prescribed correlation direction candidate whose center is the interpolation pixel P0. FIG. 2 illustrates such an example that seven directions (L1 to L7) are set as the correlation direction candidates by using pixels of seven pixels×two lines. The symmetric pixel selecting circuit 21 of the first correlation detecting unit 20 holds the respective pixels signal in a correlation direction detecting range, selects point-symmetric pairs of pixels (A1, B7), (A2, B6), - - - , (A7, B1) whose center is the interpolation pixel P0 respectively, and outputs pixel signals of each pair of pixels to the correlation value calculation circuit 22. The correlation value calculation circuit 22 calculates a correlation value of each pair of pixels respectively. The correlation value calculation circuit 22 outputs the obtained correlation value to a correlation direction deciding unit 40.

Conventionally, a correlation direction candidate is decided to be a correlation direction, which corresponds to a pair of pixels providing the highest correlation in respective correlation values obtained by the first correlation detecting unit 20, and an interpolation pixel is generated by using two pixels positioned in the correlation direction.

On the other hand, in the present embodiment, the correlation direction deciding unit 40 utilizes not only output of the first correlation detecting unit 20 but also output of the second correlation detecting unit 30. The second correlation detecting unit 30 detects a correlation direction by using a pair of pixels positioned in a direction which is parallel with a direction of each pair of pixels used by the first correlation detecting unit 20.

Figure 3:
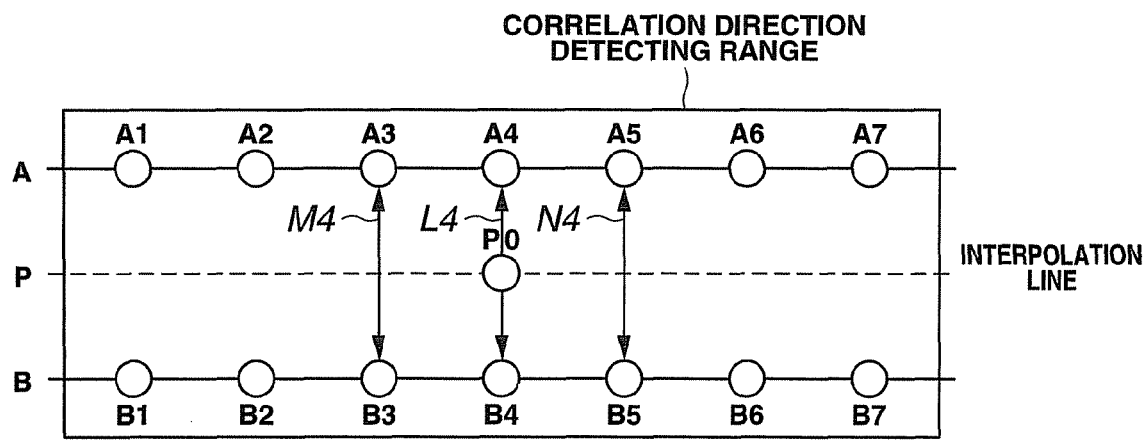
FIG. 3 is an explanatory diagram describing a second correlation detecting unit 30.
Figure 4:
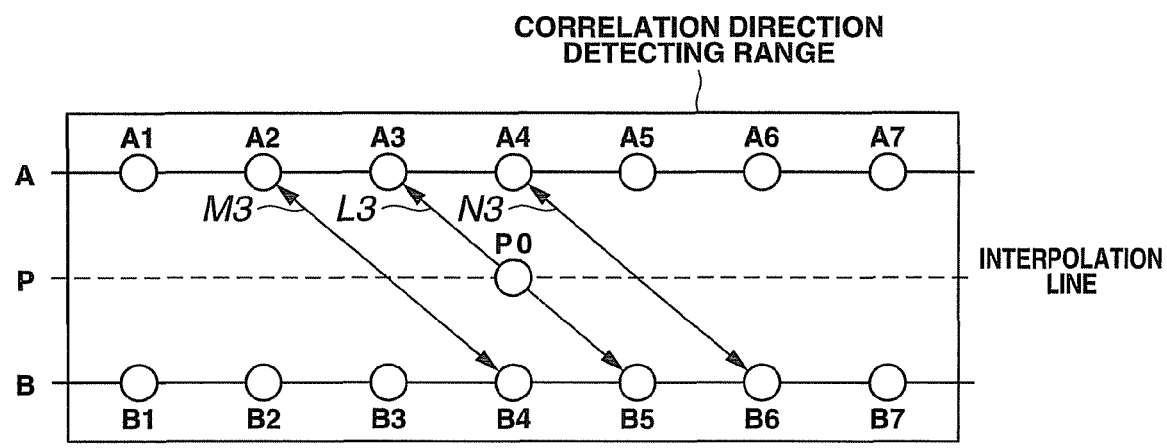
FIG. 4 is an explanatory diagram describing the second correlation detecting unit 30.
Figure 5:
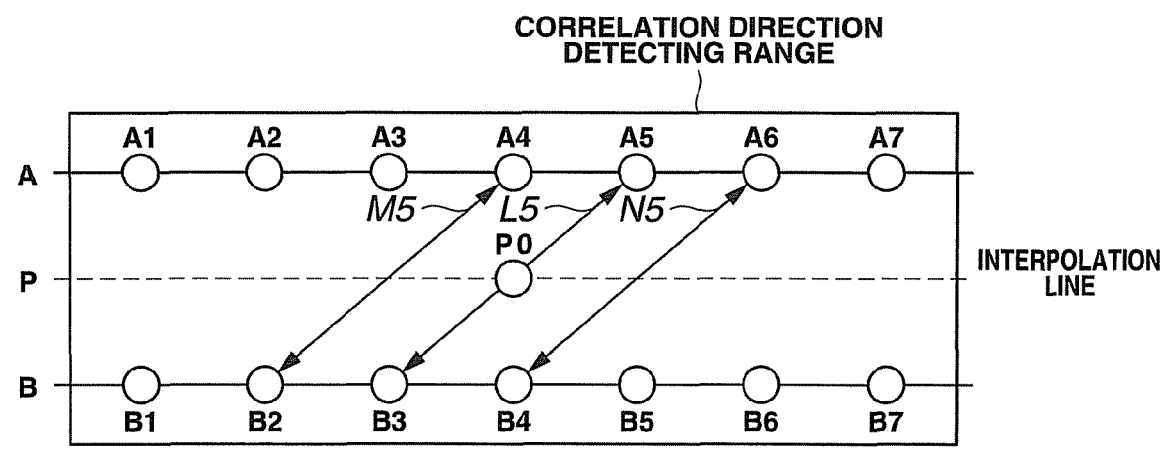
FIG. 5 is an explanatory diagram describing the second correlation detecting unit 30.

FIG. 3 to FIG. 5 are explanatory diagrams describing the second correlation detecting unit 30. In FIG. 3 to FIG. 5, horizontal lines A, B, P and the respective pixels represent the same lines and pixels as those of FIG. 2.

A symmetric and parallel pixel selecting circuit 31 of the second correlation detecting unit 30 selects a pair of pixels at a position which is point-symmetric to an interpolation pixel, as a pair of pixels for obtaining a correlation direction, like the symmetric pixel selecting circuit 21. Further, the symmetric and parallel pixel selecting circuit 31 selects one or more pairs of pixels positioned in a direction which is parallel to a direction of the selected pair of pixels at a point-symmetric position. That is, the symmetric and parallel pixel selecting circuit 31 designates two pixels which are shifted by the same distance and in the same direction respectively with respect to the respective pixels at a point which is point-symmetric to an interpolation pixel to be a pair of pixels used for detecting a correlation direction.

In such a case, the second correlation detecting unit 30 sets correlation direction candidates whose number is smaller than the number of the candidates set by the first correlation detecting unit 20 as correlation direction candidates to be set. FIG. 3 to FIG. 5 illustrate such examples that one of three correlation direction candidates is detected by using pixels of 5 pixels×two lines.

In examples of FIG. 3 to FIG. 5, the symmetric and parallel pixel selecting circuit 31 sets three directions as correlation direction candidates, and selects pairs of pixels used for deciding correlations of three set directions. That is, as illustrated in FIG. 3, the symmetric and parallel pixel selecting circuit 31 selects the symmetric pair of pixels (A4, B4) as a pair of pixels for detecting a vertical correlation direction candidate, sets two directions M4 and N4 which are parallel to a direction L4 of this pair of pixels, and selects pairs of pixels (A3, B3), (A5, B5) in these directions as parallel pairs of pixels. As illustrated in FIG. 4, the symmetric and parallel pixel selecting circuit 31 selects the symmetric pair of pixels (A3, B5) as a pair of pixels for detecting a left and diagonal correlation direction candidate, sets two directions M3 and N3 which are parallel to a direction L3 of this pair of pixels, and selects pairs of pixels (A2, B4), (A4, B6) in these directions as parallel pairs of pixels. Furthermore, as illustrated in FIG. 5, the symmetric and parallel pixel selecting circuit 31 selects the symmetric pair of pixels (A5, B3) as a pair of pixels for detecting a right and diagonal correlation direction candidate, sets two directions M5 and N5 which are parallel to a direction L5 of this pair of pixels, and selects pairs of pixels (A4, B2), (A6, B4) in these directions as parallel pairs of pixels.

While in examples of FIG. 3 to FIG. 5, the symmetric and parallel pixel selecting circuit 31 sets three pairs of pixels as correlation direction candidates to be detected, it is apparent that four or more pairs of pixels may be set. The symmetric and parallel pixel selecting circuit 31 outputs pixel signals of respective selected pair of pixels to a correlation value calculation circuit 32. The correlation value calculation circuit 32 calculates a correlation value of each pair of pixels respectively. The correlation value calculation circuit 32 outputs the obtained correlation value to the correlation direction deciding unit 40.

The correlation direction deciding unit 40 includes a memory unit holding a correlation value of each pair of pixels from the correlation value calculation circuits 22 and 32. The correlation direction deciding unit 40 compares with each other the correlation values from the correlation value calculation circuit 22, and decides that a correlation direction candidate corresponding to a pair of pixels whose correlation value is minimum is a correlation direction obtained by the first correlation detecting unit 20. The correlation direction deciding unit 40 obtains the sum of correlation values of three pairs of pixels based on the same correlation direction candidate in correlation values from the correlation value calculation circuit 32 for every correlation direction candidate, and decides that a correlation direction candidate whose sum of correlation values is minimum is a correlation direction obtained by the second correlation detecting unit 30. The correlation direction deciding unit 40 outputs such a decision result to a correlation direction determining unit 41 that either one of a correlation direction obtained by the first correlation detecting unit 20 and a correlation direction obtained by the second correlation detecting unit 30 is designated to be a correlation direction.

Because the correlation direction obtained by the first correlation detecting unit 20 is selected from many correlation direction candidates, it is highly accurate. On the other hand, the correlation direction obtained by the second correlation detecting unit 30 is obtained by such a calculation that a plurality of pairs of pixels are used for one correlation direction candidate in few correlation direction candidates, so that wrong decisions are few. That is, the correlation direction deciding unit 40 according to the present embodiment can select whether a correlation direction is obtained in high accuracy, or without wrong decisions.

For example, the correlation direction deciding unit 40 can select and output a correlation direction obtained by the first correlation detecting unit 20 and a correlation direction obtained by the second correlation detecting unit 30 based on a detection result by the horizontal high frequency detecting circuit 35.

Video signals before and after an interpolation line are inputted to the horizontal high frequency detecting circuit 35. The horizontal high frequency detecting circuit 35 detects a horizontal high frequency component of lines before and after an interpolation line. The horizontal high frequency detecting circuit 35 obtains the horizontal high frequency components for pixels selected for detecting a correlation direction in the first and second correlation detecting units 20 and 30. The horizontal high frequency detecting circuit 35 compares each obtained horizontal high frequency component with a prescribed threshold, and decides whether or not a pixel of a correlation direction candidate is included in a horizontal high frequency component area according to the number of horizontal high frequency components which are no less than the prescribed threshold. The horizontal high frequency detecting circuit 35 delivers the decision result to the correlation direction deciding unit 40.

Meanwhile, the horizontal high frequency component area is an area in which a horizontal frequency is high, for example, in such a pattern part of thickly growing leaves, a pattern part of slender branches, etc., if only a correlation value calculation by using a symmetric pair of pixels is used, wrong decision for a correlation direction is easily induced.

When the decision result of the horizontal high frequency detecting circuit 35 is provided, and the pair of pixels of a correlation direction obtained by the first correlation detecting unit 20 is included in the horizontal high frequency component area, the correlation direction deciding unit 40 selects a correlation direction obtained by the second correlation detecting unit 30 and outputs to the correlation direction determining unit 41. When the pair of pixels of a correlation direction obtained by the first correlation detecting unit 20 is not included in the horizontal high frequency component area, the correlation direction deciding unit 40 selects a correlation direction obtained by the first correlation detecting unit 20 and outputs to the correlation direction determining unit 41.

The correlation direction determining unit 41 determines a pair of pixels used for generating an interpolation pixel based on a decision result of a correlation direction by the correlation direction deciding unit 40. That is, the correlation direction determining unit 41 determines a pair of pixels on a correlation direction as a pair of pixels used for generating an interpolation pixel. The correlation direction determining unit 41 indicates the pair of pixels used for generating an interpolation pixel to an interpolation pixel generating circuit 42. The interpolation pixel generating circuit 42 includes a memory unit which is not illustrated and memorizes video signals of lines before and after an interpolation line. The interpolation pixel generating circuit 42 generates an interpolation pixel with a prescribed calculation, e.g. an average calculation, using the indicated pair of pixels. The interpolation pixel generating circuit 42 outputs the generated interpolation pixel as an interpolation signal to an output terminal 43.

Next, operations of the embodiment configured as above will be described.

An input video signal inputted through the input terminal 11 is delayed by one horizontal period in the line memory 12. A video signal from the input terminal 11 and output of the line memory 12 are delivered to the first and second correlation detecting units 20 and 30.

The symmetric pixel selecting circuit 21 of the first correlation detecting unit 20 selects a symmetric pair of pixels of an interpolation pixel to output signals of the pixels to the correlation value calculation circuit 22. The first correlation detecting unit 20 selects, for example, pairs of pixels of the seven correlation direction candidates of FIG. 2. The correlation value calculation circuit 22 obtains a correlation value for every pair of pixels of each correlation direction candidate, and outputs a calculated result to the correlation direction deciding unit 40. The correlation direction deciding unit 40 designates a correlation direction candidate which provides a minimum correlation value of correlation values from the correlation value calculation circuit 22 to be a correlation direction by the first correlation detecting unit 20.

The symmetric and parallel pixel selecting circuit 31 of the second correlation detecting unit 30 selects a symmetric pair of pixels of an interpolation pixel, and also selects two pixels which are parted by the same distance and in the same direction from the respective pixels of the selected pair of pixels as a parallel pair of pixels. For example, as illustrated in FIG. 3 to FIG. 5, the symmetric and parallel pixel selecting circuit 31 selects three pairs of pixels on three correlation direction candidates. The symmetric and parallel pixel selecting circuit 31 outputs pixel signals of each selected pair of pixels to the correlation value calculation circuit 32. The correlation value calculation circuit 32 obtains a correlation value for every pair of pixels of each correlation direction candidate, and outputs the calculated result to the correlation direction deciding unit 40. The correlation direction deciding unit 40 adds the correlation values from the correlation value calculation circuit 32 for every correlation direction candidate, and designates a correlation direction candidate whose sum is minimum to be a correlation direction by the second correlation detecting unit 30.

On the other hand, video signals of lines before and after an interpolation line are also delivered to the horizontal high frequency detecting circuit 35. The horizontal high frequency detecting circuit 35 detects a horizontal high frequency component for each pair of pixels selected by the first and second correlation detecting units 20 and 30 for detecting a correlation direction. The horizontal high frequency detecting circuit 35 compares each obtained horizontal high frequency component with a prescribed threshold, and decides whether or not a pixel of a correlation direction candidate is included in a horizontal high frequency component area according to the number of horizontal high frequency components which are no less than the prescribed threshold. The horizontal high frequency detecting circuit 35 delivers the decision result to the correlation direction deciding unit 40.

The correlation direction deciding unit 40 decides whether or not a pair of pixels of a correlation direction obtained by the first correlation detecting unit 20 is included in a horizontal high frequency component area based on the decision result of the horizontal high frequency detecting circuit 35. When the pair of pixels of a correlation direction obtained by the first correlation detecting unit 20 is included in a horizontal high frequency component area, the correlation direction deciding unit 40 selects a correlation direction by the second correlation detecting unit 30, and if not, selects a correlation direction by the first correlation detecting unit 20.

As described above, when, for example, an interpolation pixel is a pixel in a pattern of slender branches, if only a detection result by the first correlation detecting unit 20 is used for deciding a correlation direction, a correlation direction candidate from pairs of pixels of a pattern part of a background may be selected as a correlation direction. Even in such a case, the pattern part is decided to be a horizontal high frequency component area, so that the correlation direction deciding unit 40 selects a correlation direction of the second correlation detecting unit 30. That is, it is possible to prevent an interpolation pixel from being generated by a pair of pixels of a background part.

The second correlation detecting unit 30 detects a correlation of each correlation direction candidate with pixels on a line including an interpolation pixel and pixels on lines which are parallel to the line including the interpolation pixel. Thus, when an interpolation pixel is a pixel in a branch pattern, such a possibility is low that the sum of correlation values of correlation direction candidates in a direction which is widely shifted from a direction in which a branch grows becomes small, and such a possibility is high that the sum of correlation values of correlation direction candidates in a direction which is close to a direction in which a branch of a pattern grows becomes small. That is, if the correlation direction deciding unit 40 selects a correlation direction by the second correlation detecting unit 30 by using a decision result of the horizontal high frequency detecting circuit 35, it is possible to detect a correlation direction with few wrong decisions.

The correlation direction determining unit 41 determines a pair of pixels used for generating an interpolation pixel based on a decision result of a correlation direction by the correlation direction deciding unit 40. The correlation direction determining unit 41 indicates the pair of pixels used for generating an interpolation pixel to the interpolation pixel generating circuit 42. The interpolation pixel generating circuit 42 generates an interpolation pixel with a prescribed calculation, e.g. an average calculation, using the indicated pair of pixels. Meanwhile, even if a correlation direction by the second correlation detecting unit 30 is selected, a pair of pixels, symmetric pair of pixels, is indicated to the interpolation pixel generating circuit 42 based on the correlation direction. The interpolation pixel generating circuit 42 outputs the generated interpolation pixel as an interpolation signal.

As described above, in the present embodiment, the first correlation detecting unit 20 obtains a correlation direction in high accuracy which is a direction of a pair of pixels used for generating an interpolation pixel, and the second correlation detecting unit 30 obtains a correlation direction without wrong decisions. By deciding a horizontal high frequency component area with the horizontal high frequency detecting circuit 35, one of correlation directions by the first and second correlation detecting units 20 and 30 is selected, so that it is possible to prevent wrong decisions and generate an interpolation pixel in high accuracy. Thereby, it is possible to interpolate by using pixels in the same pattern, and even in a slender line-like pattern part, etc., it is possible to interpolate without inducing breaks, unsharpness, jaggy, etc.

Second Embodiment

Figure 6:
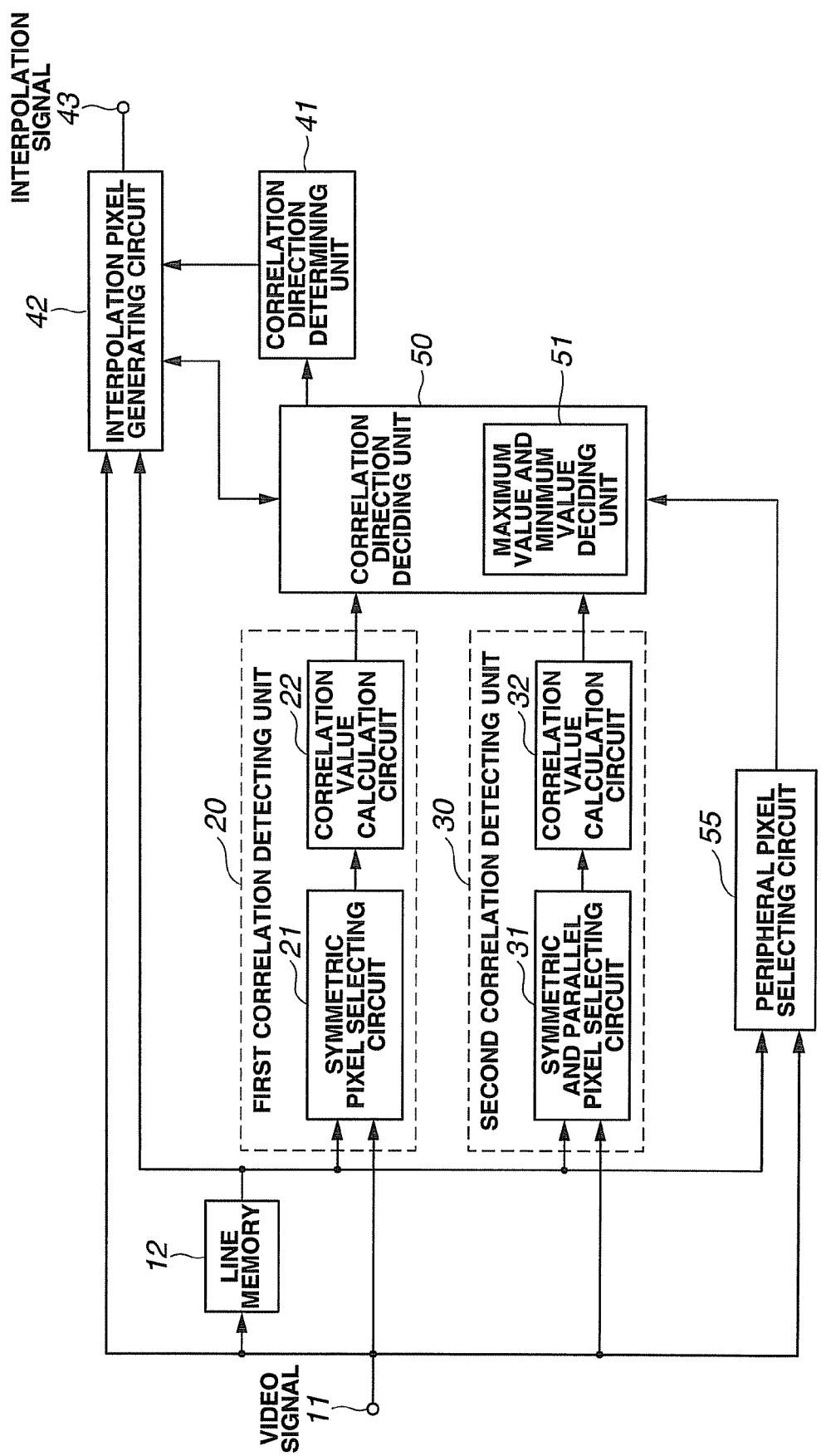
FIG. 6 is a block diagram illustrating a second embodiment of the present invention.

FIG. 6 is a block diagram illustrating a second embodiment of the present invention. In FIG. 6, the same code is attached to the same component as that of FIG. 1, and the description will be omitted.

The present embodiment also adopts the first and second correlation detecting units 20 and 30. In the present embodiment, it is determined to use which one of outputs from the first and second correlation detecting units 20 and 30 by deciding the reliability of a generated interpolation signal.

The present embodiment adopts a peripheral pixel selecting circuit 55 instead of the horizontal high frequency detecting circuit 35, and also adopts a correlation direction deciding unit 50 instead of the correlation direction deciding unit 40. The peripheral pixel selecting circuit 55 selects a pixel around an interpolation pixel in pixels of lines before and after an interpolation line to output a signal of the pixel to the correlation direction deciding unit 50.

The correlation direction deciding unit 50 is provided with outputs of the first and second correlation detecting units 20 and 30. The correlation direction deciding unit 50, first, obtains a correlation direction by using output of the first detecting unit 20. The correlation direction deciding unit 50 outputs the decision result of a correlation direction by the first correlation detecting unit 20 to the correlation direction determining unit 41. The correlation direction determining unit 41 indicates a pair of pixels based on a correlation direction by the first correlation detecting unit 20 to the interpolation pixel generating circuit 42 based on the decision result of the correlation direction deciding unit 50. The interpolation pixel generating circuit 42 obtains a pixel signal with, e.g. an average calculation by using the indicated pair of pixels.

In the present embodiment, the interpolation pixel generating circuit 42 outputs the thus obtained pixel signal as a temporary interpolation pixel signal to the correlation direction deciding unit 50. The correlation direction deciding unit 50 includes a maximum value and minimum value deciding unit 51. The maximum value and minimum value deciding unit 51 is delivered with a pixel signal from the peripheral pixel selecting circuit 55 and a temporary interpolation pixel signal. The maximum value and minimum value deciding unit 51 compares the pixel signal around an interpolation pixel with the temporary interpolation pixel signal to decide whether or not the temporary interpolation pixel signal is a maximum value or a minimum value of a pixel signal of the peripheral pixel.

When there is not a wrong decision in the decision result of a correlation direction, it is highly possible that a value of the temporary interpolation pixel signal is relatively close to that of a pixel signal of the peripheral pixel. On the contrary, when a value of the temporary interpolation pixel signal is relatively apart from that of a pixel signal of the peripheral pixel, it is highly possible that there is a wrong decision in the decision result of a correlation direction.

For this reason, when a value of the temporary interpolation pixel signal is a maximum value or a minimum value of a pixel signal of the peripheral pixel, the correlation direction deciding unit 50 outputs a correlation direction by the second correlation detecting unit 30 as a decision result. When a value of the temporary interpolation pixel signal is not a maximum value or a minimum value of a pixel signal of the peripheral pixel, the correlation direction deciding unit 50 instructs the interpolation pixel generating circuit 42 to output the temporary interpolation pixel signal as an interpolation signal.

When the decision result of a correlation direction by the second correlation detecting unit 30 is provided, the correlation direction determining unit 41 outputs a pair of pixels based on the decision result to the interpolation pixel generating circuit 42. In such a case, the interpolation pixel generating circuit 42 generates a pixel signal of an interpolation pixel by using a pair of pixels which has been newly set, and outputs as an interpolation signal.

Figure 7:
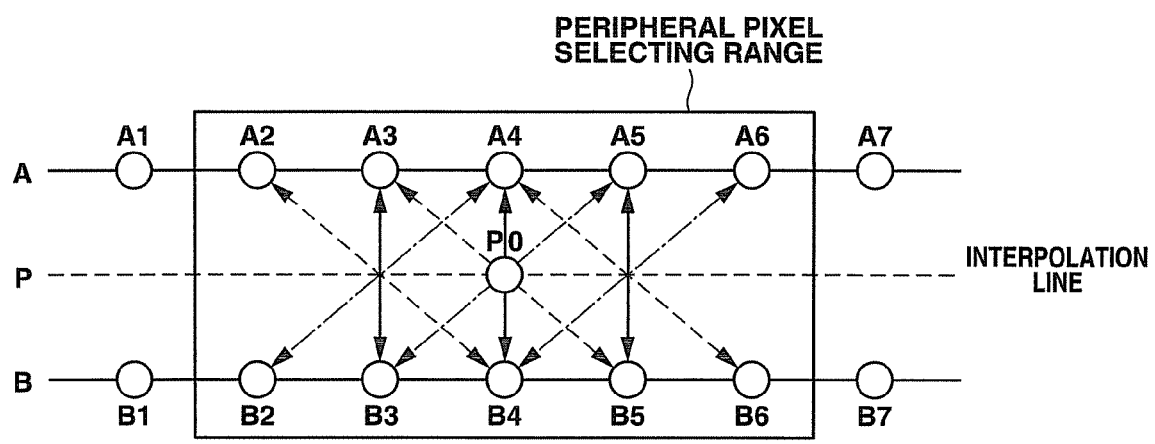
FIG. 7 is an explanatory diagram describing operations of the second embodiment.

Next, operations of the embodiment configured as above will be described referring to FIG. 7. FIG. 7 is an explanatory diagram describing a selecting range of the peripheral pixel selecting circuit 55. In FIG. 7, horizontal lines A, B, P and the respective pixels represent the same lines and pixels as those of FIG. 2.

A correlation value of a pair of pixels of each correlation direction candidate is delivered from the first and second correlation detecting units 20 and 30 to the correlation direction deciding unit 50. A correlation direction candidate of the first correlation detecting unit 20 is based on a symmetric pair of pixels, and a correlation direction candidate of the second correlation detecting unit 30 is based on a symmetric pair of pixels and a parallel pair of pixels.

The correlation direction deciding unit 50, first, selects one of correlation direction candidates by the first correlation detecting unit 20 to output it as a decision result of a correlation direction to the correlation direction determining unit 41. The correlation direction determining unit 41 outputs a pair of pixels based on the inputted decision result to the interpolation pixel generating circuit 42. The interpolation pixel generating circuit 42 generates a pixel signal by using the indicated pair of pixels, and outputs as a temporary interpolation pixel signal to the correlation direction deciding unit 50.

On the other hand, video signals of lines before and after an interpolation line are also delivered to the peripheral pixel selecting circuit 55. The peripheral pixel selecting circuit 55 selects peripheral pixels of an interpolation pixel. FIG. 7 illustrates a selecting range of the peripheral pixel selecting circuit 55. FIG. 7 illustrates such an example that a peripheral pixel selecting range of five pixels×two lines whose center is an interpolation pixel is set. The peripheral pixel selecting circuit 55 outputs pixel signals of peripheral pixels to the correlation direction deciding unit 50.

The correlation direction deciding unit 50 compares a temporary interpolation pixel signal with the pixel signals of peripheral pixels to decide whether or not the temporary interpolation pixel signal is a maximum value or a minimum value of the pixel signals of peripheral pixels. When the temporary interpolation pixel signal is not a maximum value or a minimum value of the pixel signals of peripheral pixels, the correlation direction deciding unit 50 instructs the interpolation pixel generating circuit 42 to output the temporary interpolation pixel signal as an interpolation signal. Thereby, in such a case, the interpolation pixel generating circuit 42 can obtain an interpolation pixel generated in high accuracy by using a pair of pixels based on a correlation direction by the first correlation detecting unit 20.

On the other hand, when the temporary interpolation pixel signal is a maximum value or a minimum value of the pixel signals of peripheral pixels, the correlation direction deciding unit 50 outputs a decision result of a correlation direction by the second correlation detecting unit 30 to the correlation direction determining unit 41. Thereby, the correlation direction determining unit 41 indicates a pair of pixels based on the decision result to the interpolation pixel generating circuit 42, and the interpolation pixel generating circuit 42 generates a pixel signal of an interpolation pixel by using the indicated symmetric pair of pixels. Thus, in such a case, the interpolation pixel generating circuit 42 generates an interpolation pixel by using a pair of pixels based on such a correlation direction that wrong decisions by the second correlation detecting unit 30 are few.

As described above, in the present embodiment, one of correlation directions by the first and second correlation detecting units 20 and 30 is selected by comparing the pixel signals of peripheral pixels with a temporary interpolation pixel signal generated by using a pair of pixels based on a correlation direction by the first correlation detecting unit 20, so that it is possible to prevent wrong decisions and generate a highly accurate interpolation pixel.

Meanwhile, according to whether or not the temporary interpolation pixel signal is a maximum value or a minimum value of the pixel signals of peripheral pixels, the correlation direction deciding unit 50 decides whether or not there is a wrong decision in a correlation direction by the first correlation detecting unit 20, however, when a value of the temporary interpolation pixel signal is parted by no less value than a prescribed threshold from values of the pixel signals of peripheral pixels, the correlation direction deciding unit 50 may decide that there is a wrong decision.

Third Embodiment

Figure 8:
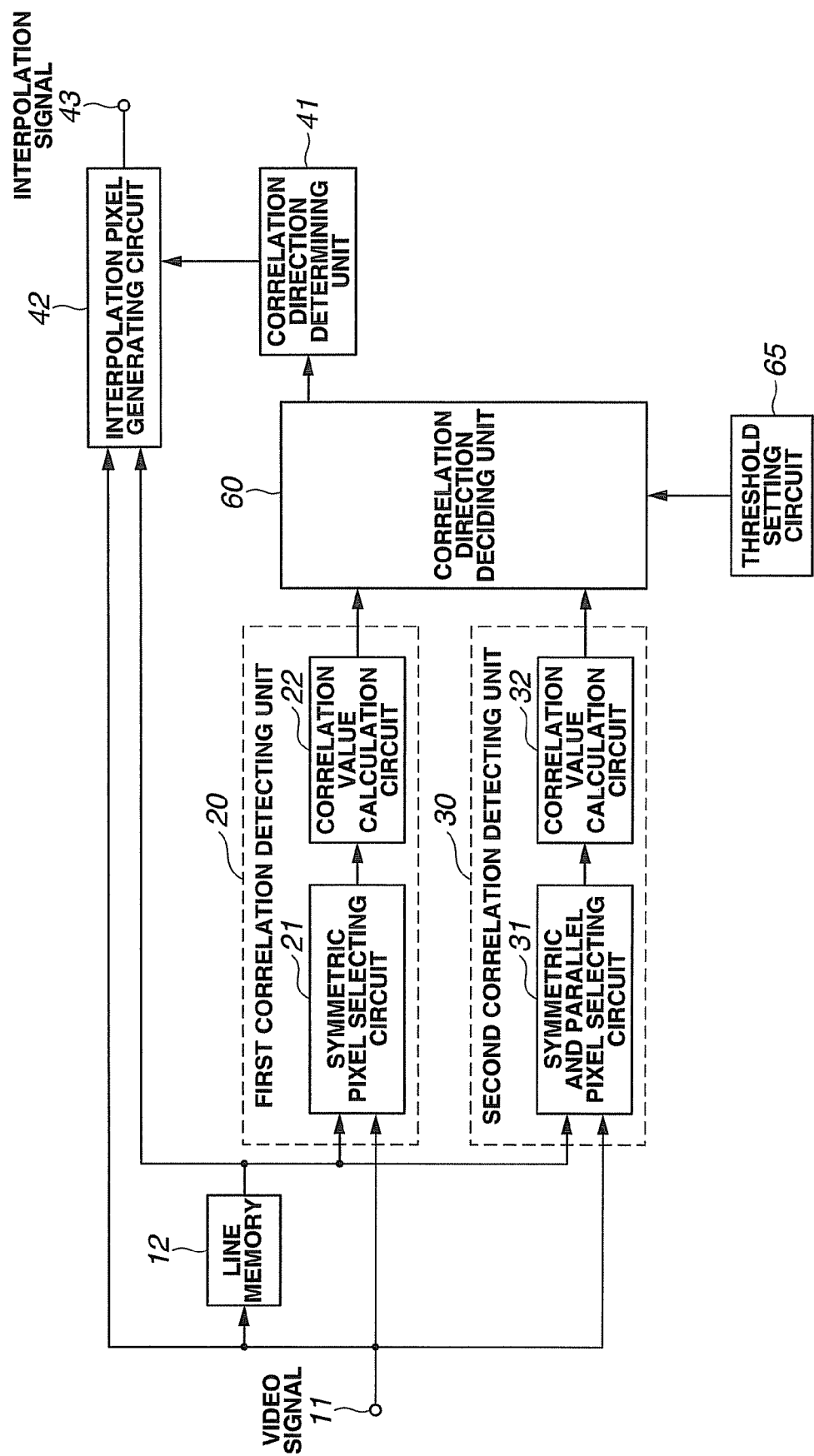
FIG. 8 is a block diagram illustrating a third embodiment of the present invention.

FIG. 8 is a block diagram illustrating a third embodiment of the present invention. In FIG. 8, the same code is attached to the same component as that of FIG. 1, and the description will be omitted.

The present embodiment also adopts the first and second correlation detecting units 20 and 30. In the present embodiment, it is determined to use which one of outputs from the first and second correlation detecting units 20 and 30 by deciding the reliability of a decision result of a correlation direction.

The present embodiment adopts a threshold setting circuit 65 instead of the horizontal high frequency detecting circuit 35, and also adopts a correlation direction deciding unit 60 instead of the correlation direction deciding unit 40. The threshold setting circuit 65 sets a threshold for correlation values from the first and second correlation detecting units 20 and 30. The threshold setting circuit 65 provides the set threshold to the correlation direction deciding unit 60. The threshold setting circuit 65 can set a plurality of thresholds as a threshold. For example, the threshold setting circuit 65 sets the first and second thresholds which are mutually different.

When the reliability of a correlation direction is high which is obtained according to correlation values from the first and second correlation detecting units 20 and 30, it can be considered that the correlation value for determining the correlation direction is sufficiently small. When the value is relatively large even if it is the minimum correlation value obtained by the first and second correlation detecting units 20 and 30, it is possible that there is a wrong decision on a correlation direction based on the minimum correlation value.

Thus, in the present embodiment, when the minimum correlation value from the first and second correlation detecting units 20 and 30 is no less than a threshold set by the threshold setting circuit 65, the correlation direction deciding unit 60 causes a decision result of a correlation direction according to the correlation value to be invalid.

For example, it is assumed that the relation of two thresholds set by the threshold setting circuit 65 is such a relation that a first threshold<a second threshold. In such a case, for example, when the minimum correlation value from the first correlation detecting unit 20 is no less than the set first threshold, the correlation direction deciding unit 60 outputs a correlation direction by the second correlation detecting unit 30 as a decision result, and also when the minimum correlation value from the second correlation detecting unit 30 is no less than the set second threshold, the correlation direction deciding unit 60 outputs such a decision result that a pair of pixels at a horizontally same position (upper and under direction (vertical direction)) is set to an interpolation pixel.

In addition, the threshold setting circuit 65 may output only one threshold. In such a case, for example, when the minimum correlation value from the first correlation detecting unit 20 is no less than the set threshold, the correlation direction deciding unit 60 may output a correlation direction by the second correlation detecting unit 30 as a decision result, and on the contrary, when the minimum correlation value from the second correlation detecting unit 30 is no less than the set threshold, the correlation direction deciding unit 60 may output a correlation direction by the first correlation detecting unit 20 as a decision result.

Meanwhile, when both of the minimum correlation values from the first and second correlation detecting units 20 and 30 are no less than the set threshold, the correlation direction deciding unit 60 may output a decision result indicating that a decision result of a correlation direction by the first and second correlation detecting units 20 and 30 is invalid. In such a case, the correlation direction determining unit 41 may indicate a pair of pixels at a horizontally same position (upper and under direction (vertical direction)) of an interpolation pixel as pixels to be used for generating an interpolation pixel.

When both of the minimum correlation values from the first and second correlation detecting units 20 and 30 are smaller than the set threshold, the correlation direction deciding unit 60 outputs a correlation direction by the first correlation detecting unit 20 as a decision result.

Next, the embodiment configured as above will be described.

A correlation value of a pair of pixels of each correlation direction candidate is delivered from the first and second correlation detecting units 20 and 30 to the correlation direction deciding unit 60. The correlation direction deciding unit 60 is provided with a threshold which is set for a minimum correlation value from the threshold setting circuit 65. It is assumed that two thresholds whose relation is a relation: a first threshold<a second threshold is outputted from the threshold setting circuit 65.

The correlation direction deciding unit 60 decides whether or not a minimum correlation value by the first and second correlation detecting units 20 and 30 is no less than the first threshold. When the minimum correlation value is smaller than the first threshold, the correlation direction deciding unit 60 outputs a correlation direction by the first correlation detecting unit 20 as a decision result. Thereby, the interpolation pixel generating circuit 42 generates an interpolation pixel in high accuracy by using a pair of pixels based on a correlation direction by the first correlation detecting unit 20.

Among correlation values from the first and second correlation detecting units 20 and 30, when a minimum correlation value from the first correlation detecting unit 20 is no less than the first threshold and smaller than the second threshold, the correlation direction deciding unit 60 outputs a decision result of a correlation direction by the second correlation detecting unit 30 to the correlation direction determining unit 41. Thereby, the correlation direction determining unit 41 indicates a pair of pixels based on the decision result to the interpolation pixel generating circuit 42, and the interpolation pixel generating circuit 42 generates a pixel signal of an interpolation pixel by using the indicated symmetric pair of pixels. Thereby, in such a case, the interpolation pixel generating circuit 42 generates an interpolation pixel by using a pair of pixels based on a correlation direction in which wrong decisions by the second correlation detecting unit 30 are few.

When both of minimum correlation values from the first and second correlation detecting units 20 and 30 are no less than the second threshold, the correlation direction deciding unit 60 outputs a decision result indicating that correlation directions by the first and second correlation detecting units 20 and 30 are invalid to the correlation direction determining unit 41. In such a case, for example, the interpolation pixel generating circuit 42 generates an interpolation signal by using a symmetric pair of pixels at a horizontally same position as an interpolation pixel.

As described above, in the present embodiment, when the minimum correlation value from the first and second correlation detecting units 20 and 30 is no less than the threshold, it is decided that the correlation direction by the first and second correlation detecting units 20 and 30 is invalid. Thereby, it is possible to prevent a wrong decision, and also generate an interpolation pixel in high accuracy.

Fourth Embodiment

Figure 9:
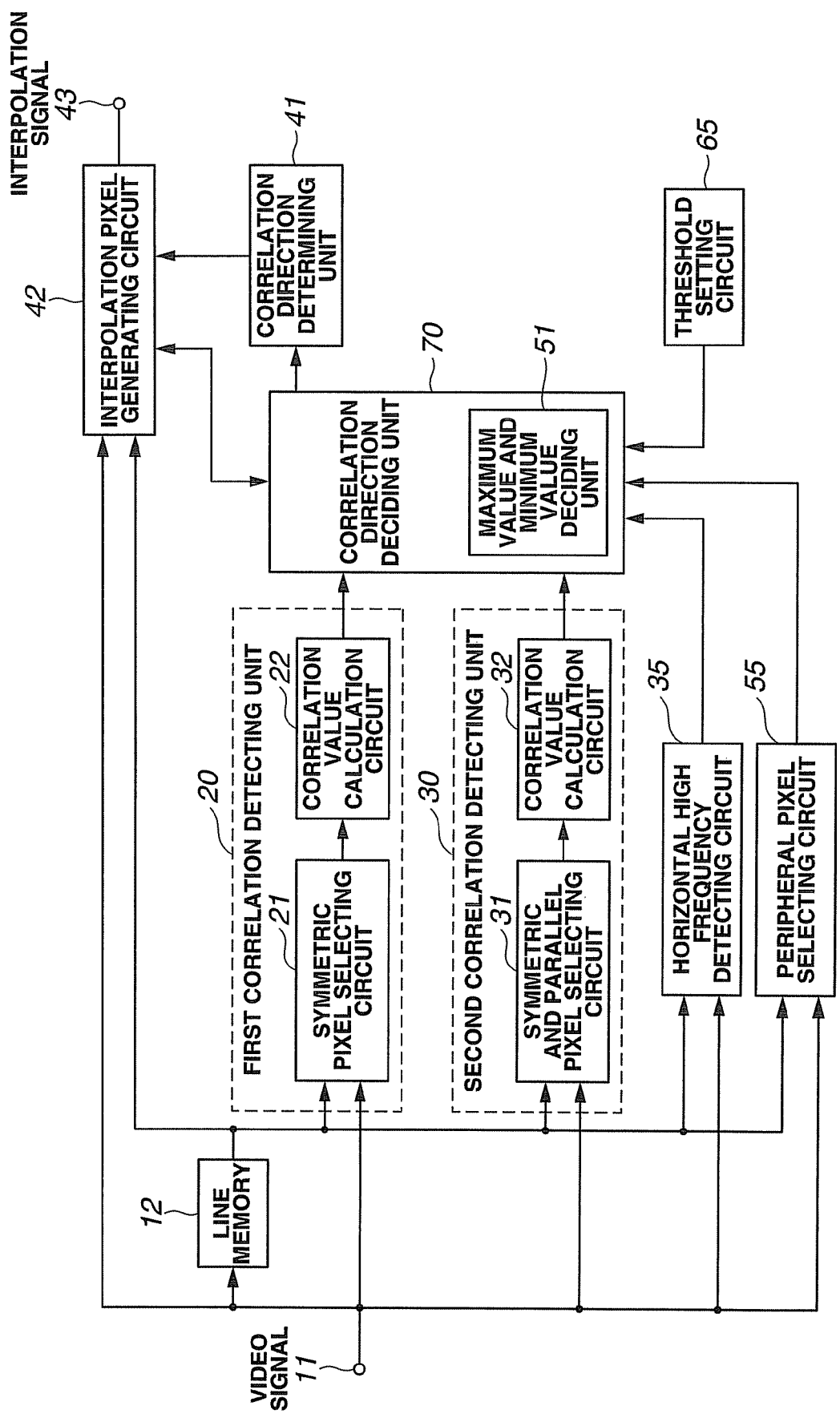
FIG. 9 is a block diagram illustrating a fourth embodiment of the present invention.

FIG. 9 is a block diagram illustrating a fourth embodiment according to the present invention. In FIG. 9, the same code is attached to the same component as that of FIG. 1, FIG. 6, and FIG. 8, and the description will be omitted.

The present embodiment is a combination of the first to third embodiments. That is, the present embodiment includes the horizontal high frequency detecting circuit 35, the peripheral pixel selecting circuit 55 and the threshold setting circuit 65. A correlation direction deciding unit 70 is provided with correlation values from the first and second correlation detecting units 20 and 30, and decides a correlation direction by using outputs of the horizontal high frequency detecting circuit 35, the peripheral pixel selecting circuit 55 and the threshold setting circuit 65.

Next, operations of the embodiment configured as above will be described referring to FIG. 10. FIG. 10 is a flowchart illustrating an example of a decision processing of a correlation direction by the correlation direction deciding unit 70.

A correlation value of a pair of pixels of each correlation direction candidate is delivered from the first and second correlation detecting units 20 and 30 to the correlation direction deciding unit 70. In addition, a decision result of the horizontal high frequency detecting circuit 35, a pixel signal from the peripheral pixel selecting circuit 55, a threshold from the threshold setting circuit 65, and a temporary interpolation pixel signal from the interpolation pixel generating circuit 42 are also inputted to the correlation direction deciding unit 70.

The correlation direction deciding unit 70 decides a correlation direction based on at least one of the decision result of a horizontal high frequency component, a pixel signal of a peripheral pixel, a threshold for a minimum correlation value, and a temporary interpolation pixel signal. Description will be made assuming that two thresholds whose relation is a relation: a first threshold<a second threshold are provided from the threshold setting circuit 65 to the correlation direction deciding unit 70.

When a minimum value of correlation values from the first and second correlation detecting units 20 and 30 is no less than the second threshold, the processing proceeds from any one of step S1 to S3 of FIG. 10 to step S4. In such a case, the correlation direction deciding unit 70 decides that the reliability of any correlation decision based on the first and second correlation detecting units 20 and 30 is low, and at step S5, outputs a decision result of a correlation direction for generating an interpolation pixel based on a symmetric pair of pixels at a horizontally same position (upper and under direction (vertical direction)).

When a minimum value of correlation values from the first and second correlation detecting units 20 and 30 is smaller than the second threshold, the decision result of a correlation direction is obtained at step S1 to S3. That is, at step S1, the correlation direction deciding unit 70 decides whether or not a pair of pixels of a correlation direction candidate is included in a horizontal high frequency component area. When the pair of pixels of a correlation direction candidate is included in the horizontal high frequency component area, the correlation direction deciding unit 70 proceeds from step S1 to step S6 through step S4, and outputs a correlation direction by the second correlation detecting unit 30 as a decision result. That is, in such a case, it is possible to generate an interpolation pixel without wrong decisions even in a fine pattern part.

When the pair of pixels of a correlation direction candidate is not included in the horizontal high frequency component, at step S2, the correlation direction deciding unit 70 decides whether or not a temporary interpolation pixel signal is a maximum value or a minimum value of pixel signals of peripheral pixels. When the temporary interpolation pixel signal is a maximum value or a minimum value of pixel signals of peripheral pixels, the processing proceeds from step S1 to step S6 through S4, and a correlation direction by the second correlation detecting unit 30 is outputted as a decision result. That is, in such a case, the reliability of the temporary interpolation pixel signal based on the first correlation detecting unit 20 is low, and the reliability of correlation values from the second correlation detecting unit 30 is relatively high, so that a highly reliable interpolation pixel is generated by generating an interpolation pixel based on the second correlation detecting unit 30.

At step S2, when deciding that the temporary interpolation pixel signal is not a maximum value or a minimum value of pixel signals of peripheral pixels, the correlation direction deciding unit 70 proceeds to next step S3, and decides whether or not a correlation value from the first correlation detecting unit 20 is smaller than the first threshold. When the correlation value from the first correlation detecting unit 20 is no less than the first threshold, the correlation direction deciding unit 70 decides the processing to proceed from step S1 to step S6 through step S4, and outputs a correlation direction by the second correlation detecting unit 30 as a decision result.

At step S3, when it is decided that the correlation value from the first correlation detecting unit 20 is smaller than the first threshold, at next step S7, a correlation direction by the first correlation detecting unit 20 is outputted as a decision result. That is, in such a case, it is possible to generate an interpolation pixel in high accuracy.

As described above, in the present embodiment, the same effect as each of the above embodiments can also be obtained.

The above embodiments have such an effect that interpolations can be executed without inducing breaks, unsharpness, jaggy, etc. even in a thin line-like pattern part and the like.

Having described the embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. A video signal processing apparatus comprising,
a first correlation detecting unit obtaining a correlation value of every symmetric pair of pixels positioned in a point-symmetry, center of which is an interpolation pixel on an interpolation line interpolated between two real lines, the symmetric pair of pixels being positioned on the two real lines of an input video signal respectively;
a second correlation detecting unit obtaining a correlation value of every pair of pixels for the symmetric pair of pixels and one or more parallel pairs of pixels positioned in a direction which is parallel to a direction of the symmetric pair of pixels, the parallel pair of pixels being positioned on the two real lines of the input video signal respectively;
a correlation direction deciding unit deciding any one of a correlation direction based on the correlation value from the first correlation detecting unit and a correlation direction based on the correlation value from the second correlation detecting unit as a correlation direction which is a direction of a pair of pixels used for generating the interpolation pixel;
an interpolation pixel generating unit generating a pixel signal of the interpolation pixel by using the pair of pixels based on a decision result of the correlation direction deciding unit; and
a horizontal high frequency component detecting unit detecting a horizontal high frequency component of a pair of pixels positioned on the two real lines of the input video signal respectively,
wherein when it is decided based on a detection result by the horizontal high frequency component detecting unit that the symmetric pair of pixels are pixels in a horizontal high frequency component area, the correlation direction deciding unit designates the correlation direction based on the correlation value from the second correlation detecting unit to be a decision result.

2. The video signal processing apparatus according to claim 1,
wherein the number of the symmetric pairs of pixels, the correlation value of which is obtained by the second correlation detecting unit, is less than the number of the symmetric pairs of pixels, the correlation value of which is obtained by the first correlation detecting unit.

3. The video signal processing apparatus according to claim 1,
wherein when it is decided based on a detection result by the horizontal high frequency component detecting unit that the symmetric pair of pixels are pixels in a horizontal high frequency component area, for the correlation value of every symmetric pair of pixels from the second correlation detecting unit, the correlation direction deciding unit calculates the sum of the correlation value of the symmetric pair of pixels and the correlation values of the one or more parallel pairs of pixels positioned in a direction which is parallel to a direction of the symmetric pair of pixels, and designates the correlation direction indicating the symmetric pair of pixels, the sum of the correlation values of which is minimum, to be a decision result.

4. A video signal processing apparatus comprising,
a first correlation detecting unit obtaining a correlation value of every symmetric pair of pixels positioned in a point-symmetry, center of which is an interpolation pixel on an interpolation line interpolated between two real lines, the symmetric pair of pixels being positioned on the two real lines of an input video signal respectively;

a second correlation detecting unit obtaining a correlation value of every pair of pixels for the symmetric pair of pixels and one or more parallel pairs of pixels positioned in a direction which is parallel to a direction of the symmetric pair of pixels, the parallel pair of pixels being positioned on the two real lines of the input video signal respectively;

a correlation direction deciding unit deciding any one of a correlation direction based on the correlation value from the first correlation detecting unit and a correlation direction based on the correlation value from the second correlation detecting unit as a correlation direction which is a direction of a pair of pixels used for generating the interpolation pixel;

an interpolation pixel generating unit generating a pixel signal of the interpolation pixel by using the pair of pixels based on a decision result of the correlation direction deciding unit;

a temporary interpolation pixel generating unit generating a temporary interpolation pixel signal by using the pair of pixels of the correlation direction based on the correlation value from the first correlation detecting unit; and a peripheral pixel selecting unit outputting the pixel signal of the pair of pixels around the interpolation pixel, the pair of pixels being positioned on the two real lines of the input video signal respectively, wherein when a value of the temporary interpolation pixel signal is a maximum value or a minimum value of the pixel signals from the peripheral pixel selecting unit, the correlation direction deciding unit designates the correlation direction based on the correlation value from the second correlation detecting unit to be a decision result.

5. The video signal processing apparatus according to claim 4,
wherein the number of the symmetric pairs of pixels, the correlation value of which is obtained by the second correlation detecting unit, is less than the number of the symmetric pairs of pixels, the correlation value of which is obtained by the first correlation detecting unit.

6. The video signal processing apparatus according to claim 4,
wherein when a value of the temporary interpolation pixel signal is a maximum value or a minimum value of the pixel signals from the peripheral pixel selecting unit, for the correlation value of every symmetric pair of pixels from the second correlation detecting unit, the correlation direction deciding unit calculates the sum of the correlation value of the symmetric pair of pixels and the correlation values of the one or more parallel pairs of pixels positioned in a direction which is parallel to a direction of the symmetric pair of pixels, and designates the correlation direction indicating the symmetric pair of pixels, the sum of the correlation values of which is minimum, to be a decision result.

7. A video signal processing apparatus comprising, a first correlation detecting unit obtaining a correlation value of every symmetric pair of pixels positioned in a point-symmetry, center of which is an interpolation pixel on an interpolation line interpolated between two real lines, the symmetric pair of pixels being positioned on the two real lines of an input video signal respectively;

a second correlation detecting unit obtaining a correlation value of every pair of pixels for the symmetric pair of pixels and one or more parallel pairs of pixels positioned in a direction which is parallel to a direction of the symmetric pair of pixels, the parallel pair of pixels being positioned on the two real lines of the input video signal respectively;

a correlation direction deciding unit deciding any one of a correlation direction based on the correlation value from the first correlation detecting unit and a correlation direction based on the correlation value from the second correlation detecting unit as a correlation direction which is a direction of a pair of pixels used for generating the interpolation pixel; and an interpolation pixel generating unit generating a pixel signal of the interpolation pixel by using the pair of pixels based on a decision result of the correlation direction deciding unit, wherein when a minimum value of the correlation values from the first correlation detecting unit is no less than a first threshold, the correlation direction deciding unit causes the correlation direction based on the correlation values from the first correlation detecting unit to be invalid, and when a minimum value of the correlation values from the second correlation detecting unit is no less than a second threshold which is different from the first threshold, the correlation direction deciding unit causes the correlation direction based on the correlation values from the second correlation detecting unit to be invalid.

8. The video signal processing apparatus according to claim 7,
wherein the number of the symmetric pairs of pixels, the correlation value of which is obtained by the second correlation detecting unit, is less than the number of the symmetric pairs of pixels, the correlation value of which is obtained by the first correlation detecting unit.

9. The video signal processing apparatus according to claim 7,
wherein when a minimum value of the correlation values from the first correlation detecting unit is no less than the first threshold, and a minimum value of the correlation values from the second correlation detecting unit is no less than the second threshold which is different from the first threshold, the correlation direction deciding unit causes the correlation direction indicating the symmetric pair of pixels in a horizontally same position as that of the interpolation pixel to be a decision result.

* * * * *